(12) United States Patent
Adogla et al.

(10) Patent No.: US 8,635,425 B1
(45) Date of Patent: Jan. 21, 2014

(54) UPGRADING COMPUTING DEVICES

(75) Inventors: Eden G. Adogla, Seattle, WA (US); Devin Kowatch, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 69 days.

(21) Appl. No.: 13/222,992

(22) Filed: Aug. 31, 2011

(51) Int. Cl.
*G06F 12/00* (2006.01)

(52) U.S. Cl.
USPC .......................................... 711/173; 714/710

(58) Field of Classification Search
USPC .......................................... 711/173; 714/710
See application file for complete search history.

(56) References Cited

U.S. PATENT DOCUMENTS

| | | | | |
|---|---|---|---|---|
| 5,631,984 | A * | 5/1997 | Graf et al. ...................... | 382/317 |
| 6,108,420 | A * | 8/2000 | Larose et al. .................... | 705/59 |
| 7,076,496 | B1 * | 7/2006 | Ruizandrade ................. | 717/170 |
| 2003/0005426 | A1 * | 1/2003 | Scholtens et al. ............. | 717/169 |
| 2003/0037202 | A1 * | 2/2003 | Kedem et al. ................. | 711/100 |
| 2005/0172279 | A1 * | 8/2005 | Cook et al. .................... | 717/162 |
| 2006/0005016 | A1 * | 1/2006 | Lee et al. ....................... | 713/164 |
| 2008/0098265 | A1 * | 4/2008 | Dmitrovich et al. .......... | 714/710 |
| 2011/0035740 | A1 * | 2/2011 | Powell et al. ................. | 717/170 |

* cited by examiner

*Primary Examiner* — Hashem Farrokh
(74) *Attorney, Agent, or Firm* — Knobbe Martens Olson & Bear LLP (57) ABSTRACT

Target host computing devices are provisioned with a machine image that corresponds to an operating environment, software applications, and associated configurations. The machine image is organized in a manner that allows static portions of the machine image to be maintained in a designated static partition. The machine image is also organized in a manner that allows dynamic portions of the machine image to be maintained in a designed dynamic partition. A host management component identifies updates to the static portion of the machine image and transmits the update information to the host computing devices. In turn, the host computing devices maintain the update in the allocated secondary partitions. Thereafter, the host computing devices causes a switch from a designated primary static partition to the secondary static partition, such as via a kernel switch.

37 Claims, 8 Drawing Sheets

UPGRADING COMPUTING DEVICES

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, the physical computing devices or instances of a virtual machine may be configured according to a number of virtual machine instance types to provide specific functionality, often referred to as provisioning. For example, various computing devices may be associated with different combinations of operating systems or operating system configurations, hardware resources (actual or virtualized) and software applications to enable a computing device to provide different desired functionalities, or to provide similar functionalities more efficiently. These customized configurations are often provided within a device image, which a computing device may process in order to implement the desired software configuration and which can be standardized among a set of host computing devices. Once the initial provisioning has occurred, however, at least a portion of the machine image (e.g., the operating environment, software applications, or configurations) may evolve due to being dynamic in nature. Accordingly, the resulting, evolved machine image on a host computing device may diverge from the initial machine image provisioned on the host computing device. For example, some portion of the machine image may correspond to log files and locally persisted state information that would be dynamic and likely different between different host computing devices or virtual machine instances provisioned from the same initial image. As such, it can be difficult for service providers, such as a data center service provider, to utilize the same standardization in providing modifications or upgrades to the machine image data.

BRIEF DESCRIPTION OF THE DRAWINGS

The foregoing aspects and many of the attendant advantages will become more readily appreciated by reference to the following detailed description, when taken in conjunction with the accompanying drawings, wherein.

DETAILED DESCRIPTION

Generally described, aspects of the present disclosure relate to the management of virtual machine instances. Specifically, systems and methods are disclosed that facilitate the provisioning and updating of machine image data for target virtual machine instances. Target host computing devices are provisioned with a machine image that corresponds to an operating environment, software applications and associated configurations. The machine image is organized in a manner that allows static portions of the machine image to be maintained in a designated static or immutable partition, which can be designated as read only. The machine image is also organized in a manner that allows dynamic or mutable portions of the machine image to be maintained in a designated dynamic partition, which can be designated as writeable. The host computing devices also allocate the secondary static partitions, with sufficient capacity to maintain additional or alternative versions of the static portion of the machine image.

In operation, a host management component identifies upgrades, modifications, replacements, generally referred to as updates, to the static portion of the machine image. The host management component transmits the update information to the host computing devices. In turn, the host computing devices maintain the update in the allocated secondary partitions. Thereafter, when specific conditions for executing an upgrade have been met, the host computing devices causes a switch from the previously designated primary static partition to the secondary static partition by resetting the operating system, through a reboot or via techniques such as a kernel switch.

While specific embodiments and example applications of the present disclosure will now be described with reference to the drawings, these embodiments and example applications are intended to illustrate, and not limit, the present disclosure. Specifically, while various embodiments and aspects of the present disclosure will be described with regard to virtual machine instances running applications, one or more aspects of the present disclosure can be applied with physical computing devices or combinations of physical computing devices and virtual machine instances.

Figure 1:
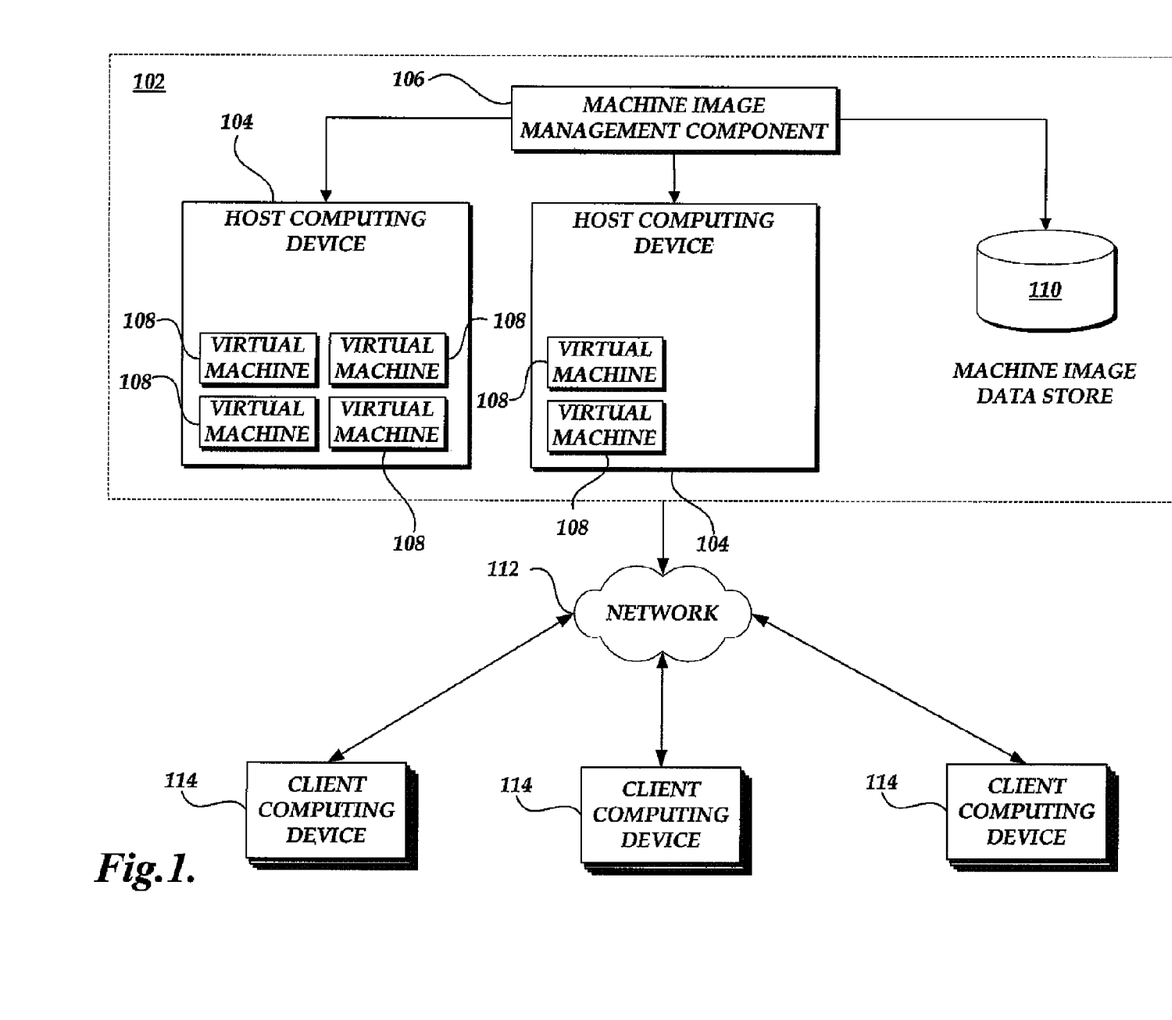
FIG. 1 is a block diagram depicting an illustrative virtual network environment including a number of host computing devices and a machine image management component.

FIG. 1 is a block diagram illustrating an embodiment of a virtual network environment 100. The virtual network environment 100 includes a virtual network 102 that includes multiple physical computing devices, generally referred to herein as host computing devices 104. Each physical computing device 104 is capable of hosting multiple virtual machine instances 108. At least some of the virtual machine instances 108 may be provisioned to provide a variety of different desired functionalities depending on the needs of the data center. Examples of the types of desired functionality, include but are not limited to: database management, serving or distributing data or content (e.g., Web servers), managing load balancing or network resources, managing network connectivity or security, providing network addressing information, managing client or server redirection, or any other functionality associated with a data center. One skilled in the relevant art will appreciate that the virtual network 102 is logical in nature and can encompass physical computing devices 104 from various geographic regions. Illustrative components of a configured virtual machine instance 108 or configured host computing device 104 will be described with regard to FIGS. 2A and 2B.

The virtual network 102 also includes machine image management component 106 for processing requests for the provisioning of machine images on virtual machine instances or host computing devices 104. Additionally, the machine image management component 106 can provide updates to one or more of host computing devices 104. Although illustrated as a single, stand-alone component, the machine image management component 106 can be implemented in a distributed manner. Additionally, one or more aspects of the machine image management component 106 may be implemented in other computing devices, such as a virtual machine instance.

With continued reference to FIG. 1, the virtual network 102 can further include a machine image data store 110 for maintaining, at least in part, code for evaluating the machine images. Additionally, the machine image data store 110 can include code corresponding to updates for one or more machines images utilized in the provisioning of virtual machine instances 108 or host computing devices 104. The machine image data store 110 may correspond to network attached storage (NAS), database servers, local storage, or other storage configurations which may be implemented in a centralized or distributed manner. Additionally, although a single machine image data store 110 is illustrated, one skilled in the relevant art will appreciate that any number of data stores may be utilized to implement the machine image data store 110.

Connected to the virtual network 102 via a network 112 are multiple client computing devices 114. The network 112 may be, for instance, a wide area network (WAN), a local area network (LAN), or a global communications network. In some instances, the client computing devices 114 may interact with the virtual network 102 to request the resource optimizations for virtual machine instance types based on a definition of one or more applications associated with the virtual machine instance type.

Figure 2A:
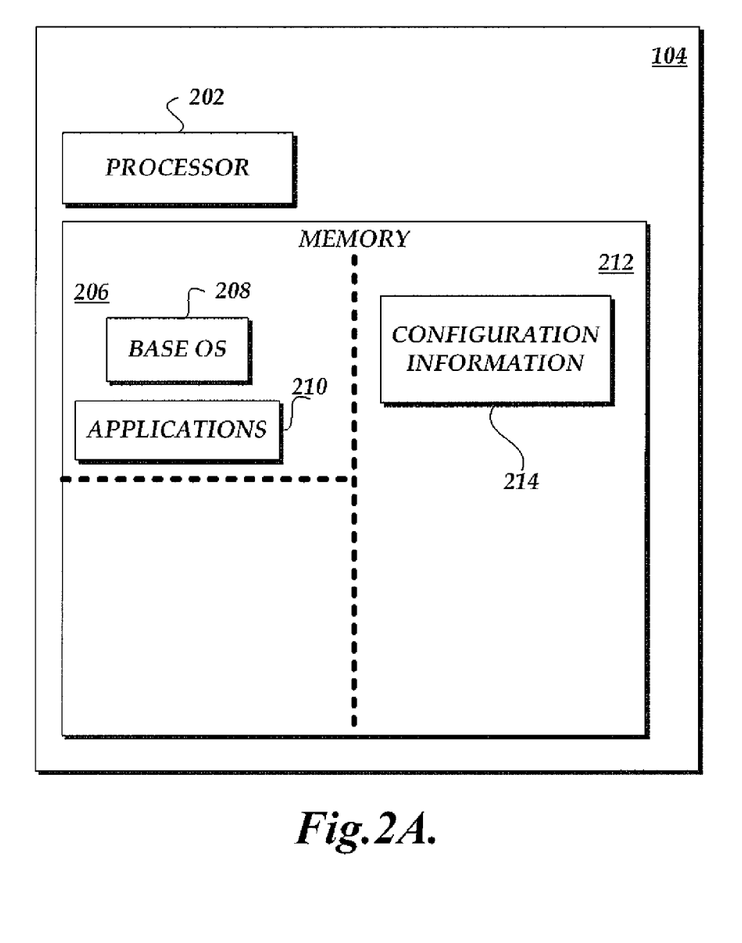
FIGS. 2A and 2B are simplified block diagrams of illustrative components of a host computing device.
Figure 2B:
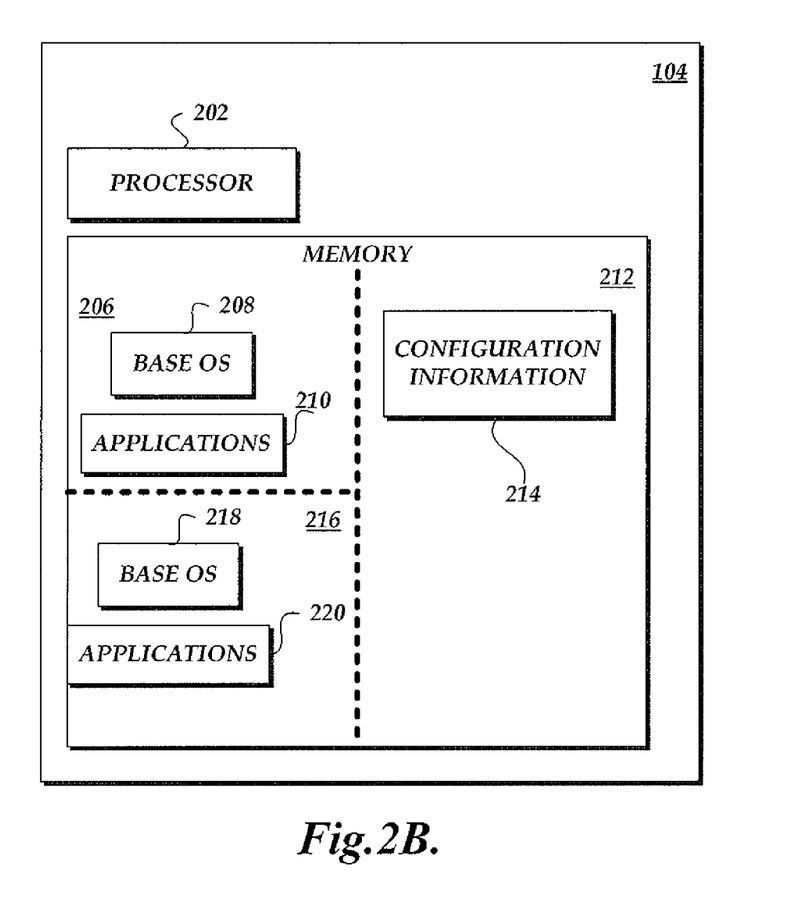

With reference now to FIGS. 2A and 2B, simplified block diagrams of illustrative components of a configured host computing device 104 will be described. In a basic configuration, the host computing device 104 includes a processing unit 202 and a memory 204. The memory 204 is an example of a computer-readable storage medium and may include volatile and nonvolatile memory or removable and non-removable media implemented in any type or technology for storage of information, such as computer-readable instructions, data structures, program modules or other data. Such memory includes, but is not limited to, RAM, ROM, EEPROM, flash memory, CD-ROM, digital versatile disks (DVD) or other optical storage, magnetic cassettes, magnetic tape, magnetic disk storage or other magnetic storage devices, RAID storage systems or any other tangible medium which can be used to store the desired information and which can be accessed by a computing device. As will be explained in greater detail below, the memory may be partitioned into a number of different partitions. Additionally, portions of the memory, such as different partitions, may be associated with different designations, such as read-only or writeable.

In an illustrative embodiment, the memory 204 may store an operating environment, any number of software applications, configuration information and runtime information, which will generally be referred to as the machine image information. At least some portion of the machine image information may be considered to be static in that the information may not change during the execution of code on the host computing device or that the information will be substantially the same across multiple host computing devices 104. Additionally, at least some portion of the machine image information may be considered to be dynamic in that the information is likely to change during the execution of code on the host computing device 104 or to be considered substantially different across multiple host computing devices.

Referring again to FIG. 2A, the memory 204 may be subdivided into at least three primary partitions. In an illustrative embodiment, a first partition 206 will be designated as a primary static partition and will be allocated in memory to maintain the static portions of the machine image information. As illustrated in FIG. 2A, the first partition 206 can include a base operating system or environment 208 and application information 210. Because the first partition is considered the primary static partition, it may be designated with a read only property or attribute. A second partition 212 will be designated as a dynamic partition and will be allocated in memory to maintain the dynamic portions of the machine image information. Illustratively, the second partition 212 includes configuration information 214 that is subject to change. Because the second partition is considered the dynamic partition, it may be designated with a read/write or writeable property or attribute. During a provisioning process, the partitions 206 and 212 can be created, defined or selected to allow the appropriate portions of the machine image to be maintained in each respective partition (or sets of partitions).

With reference now to FIG. 2B, during the execution of processes, the machine image management component 106 can provide a notification to the host computing devices 104 that updates are available, or to otherwise provide relevant updates to the host computing device. In one embodiment, the updates can relate to the static portion of the machine image. Illustratively, for each update, a secondary partition is allocated in the memory 204 for maintaining updated static portions of the machine image. In one embodiment, the updated image may be provided to the host computing device 104 for storage in the secondary partition. In another embodiment, a change or delta may be provided to the host computing device (as opposed to the entire static portion). In this embodiment, the host computing device 104 can make a copy of the previous primary static partition, apply the change or delta and then maintain the updated information in the secondary partition. As illustrated in FIG. 2B, a host computing device 104 can have larger secondary partitions 216 for maintaining updated versions of the operating system 218 and software application 220. Additionally, the memory 204 can include a series of secondary partitions for maintaining multiple sets of update information.

Figure 3A:
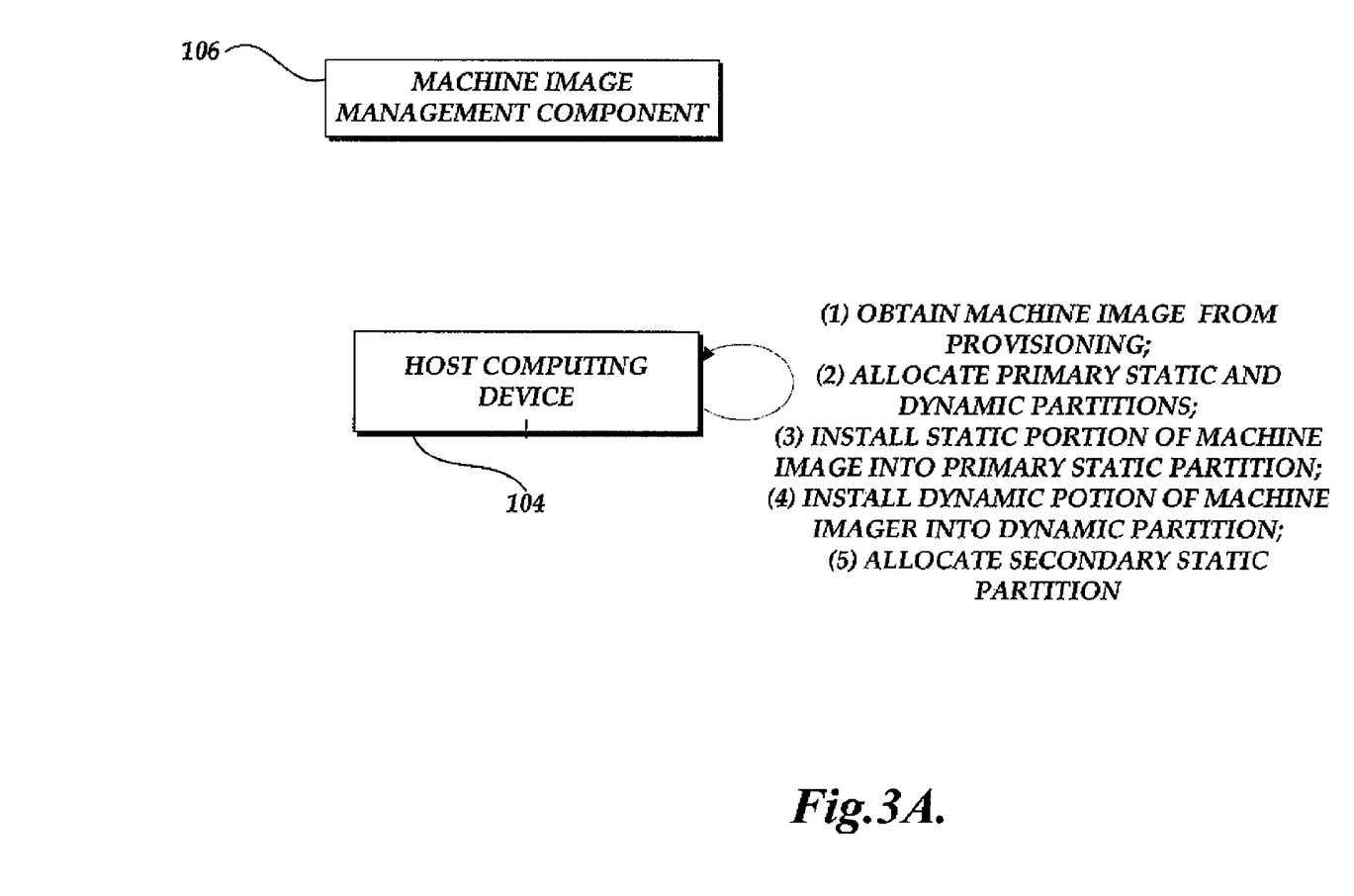
FIGS. 3A-3C are simplified block diagrams of the virtual network of FIG. 1 illustrating the provisioning and updating of machine images on host computing devices.
Figure 3B:
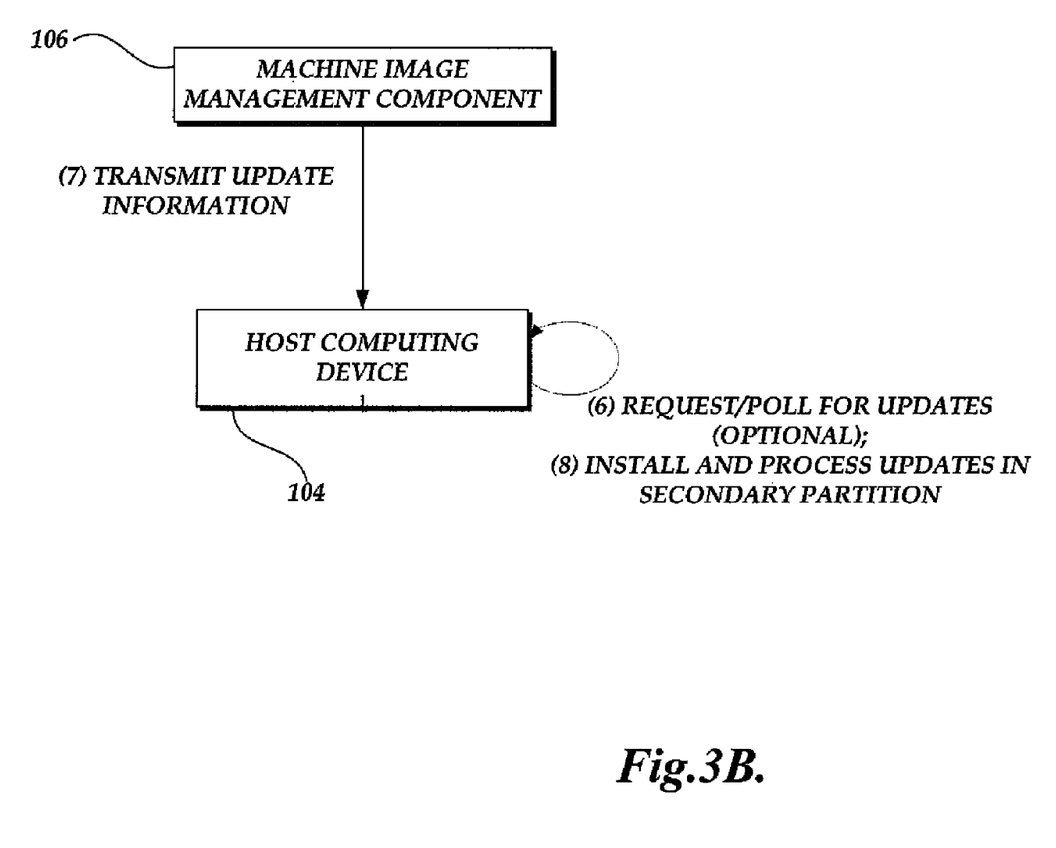
Figure 3C:
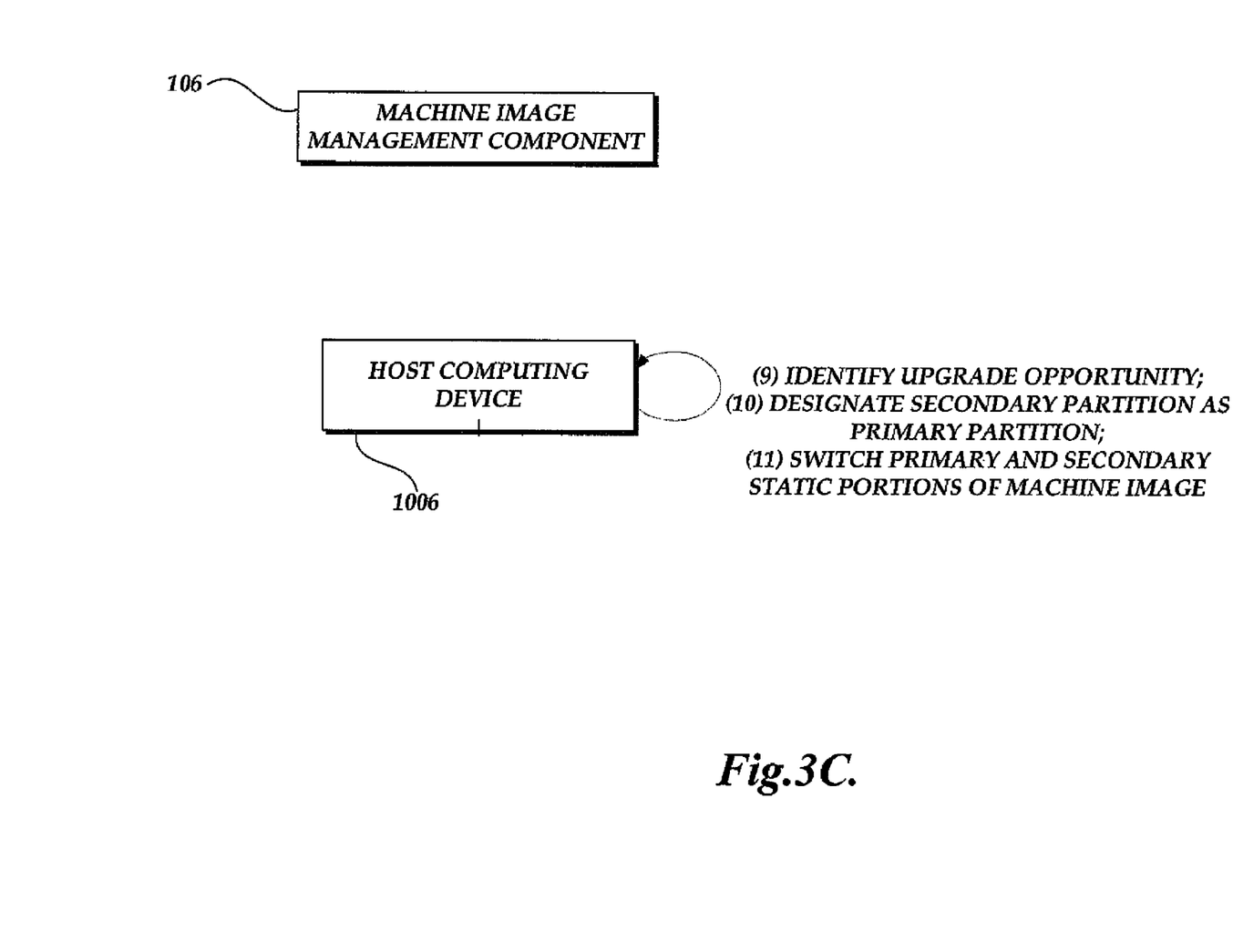

With reference now to FIGS. 3A-3C, illustrative interaction between the components of the virtual network 102 for the provisioning and updating of machine images on host computing devices will be described. With reference first to FIG. 3A, as a result of provision process, the host computing device 104 obtains machine image for execution (1). The host computing device 104 allocates a primary static partition and a dynamic partition (2). Based on the allocated partitions, the host computing device can organize the machine image into static portions and dynamic portions and install each respectively in one of the allocated partitions (3) and (4). The host computing device then allocates one or more secondary partitions. As previously described, the secondary partitions will be utilized to store upgrades or upgraded static portions of the machine image.

Turning now to FIG. 3B, at some point, the host computing device 104 can request or poll the machine management component 106 for updates for the machine images (6). In another embodiment, the machine image management component 106 may generate notifications regarding the need to update. The machine image management component 106 can then transmit or cause to be transmitted update information. In one embodiment, the update information can be a full copy of the static portion of the machine image. In this embodiment, the updated, full copy will replace the currently existing static portion. In another embodiment, the update information can be in the form of deltas or other incremental patches. In this embodiment, the updated copy will be the result of applying the update information to a copy of the current static portion of the machine image. The host computing device 104 installs the updates into one or more secondary partitions (8). As previously described, a particular machine image may be associated with a number of updates. Accordingly, the host computing device 104 can repeat the above process for each potential secondary partition.

With reference now to FIG. 3 C, once the host computing device has stored the update in a secondary partition, the host computing device 104 may be provided some criteria for determining an appropriate time for implementing the update (9). For example, an update may occur at a time in which host computing device utilization is at or below a threshold. At some point, however, the host computing device 104 determines that the update should be implemented. At this point, the host computing device can designate the primary partition as a secondary partition and the previously secondary partition as the primary partition. The host computing device 104 can then swap or switch the primary and secondary partition to implement the update. Illustratively, the host computing device can utilize a kernel switching or kernel swapping procedure that does not require a reboot.

Figure 4:
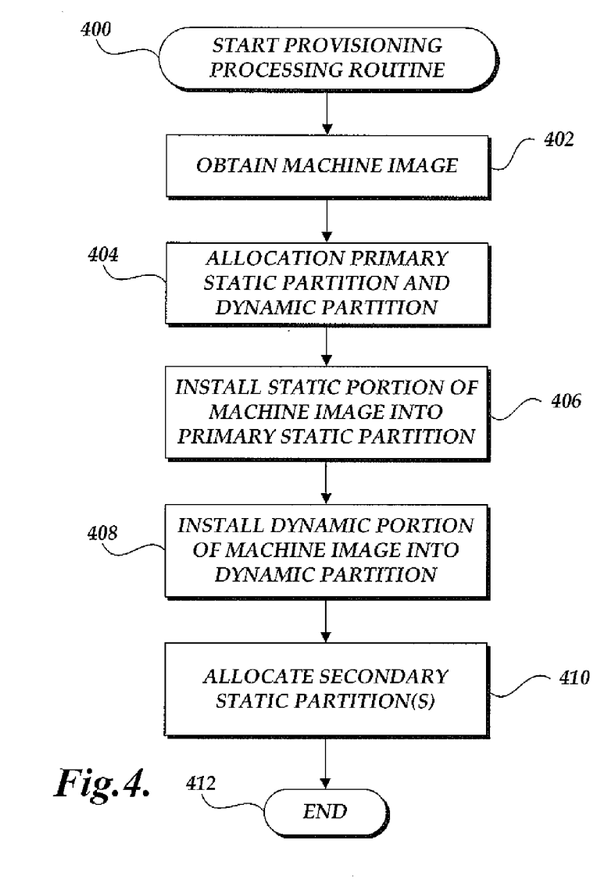
FIG. 4 is a flow diagram illustrating a virtual machine image provisioning routine implemented by a host computing device.

Turning now to FIG. 4, a routine 400 for provisioning process implemented by a host computing device 104 will be described. At block 402, the host computing device 104 obtains machine image for execution. In one embodiment, the provisioning process can be implemented in a number of ways in to order to provide the host computing device with the machine image. At block 404, the host computing device 104 allocates a primary static partition and a dynamic partition. Illustratively, the allocation of the static and dynamic partitions is based on allocating sufficient memory and processing resources to maintain the partitions.

Based on the allocated partitions, at blocks 406 and 408, the host computing device can organize the machine image into static portions and dynamic portions and install each respectively in one of the allocated partitions. At block 410, the host computing device then allocates one or more secondary partitions. As previously described, the secondary partitions will be utilized to store upgrades or upgraded static portions of the machine image. In some embodiments, block 410 may be omitted. At block 412, the routine terminates.

Figure 5:
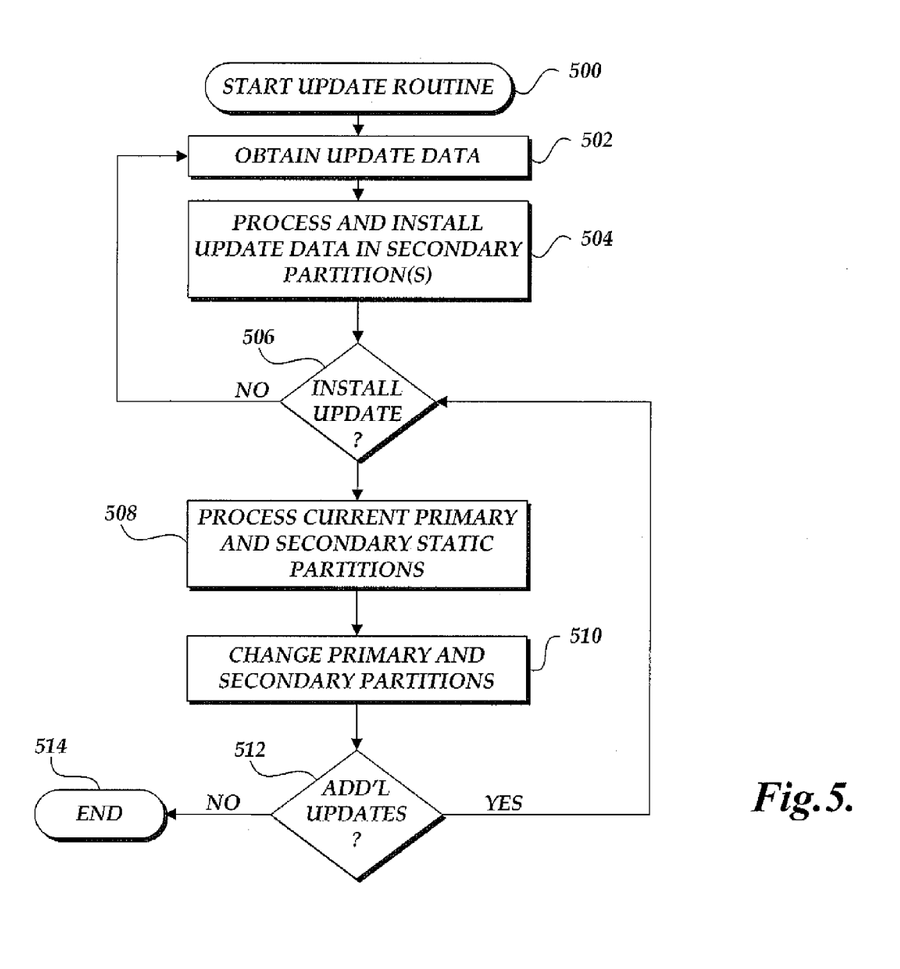
FIG. 5 is a flow diagram illustrating a virtual machine image update routine implemented by a host computing device.

With reference now to FIG. 5, a routine 500 for processing updates will be described. At block 502, the host computing device 104 can request or poll the machine management component 106 for updates for the machine images. In another embodiment, the machine image management component 106 may generate notifications regarding the need to update. The machine image management component 106 can then transmit or cause to be transmitted update information. In one embodiment, the update information can be a full copy of the static portion of the machine image. In this embodiment, the updated, full copy will replace the currently existing static portion. In another embodiment, the update information can be in the form of deltas or other incremental patches. In this embodiment, the updated copy will be the result of applying the update information to a copy of the current static portion of the machine image. In another embodiment, the host computing device 104 may transmit information utilized to select the appropriate updates, such as version numbers, serial numbers, system manifests, and the like.

At block 504, the host computing device 104 installs the updates into one or more secondary partitions. As previously described, a particular machine image may be associated with a number of updates. Accordingly, the host computing device 104 can repeat the above process for each potential secondary partition. As previously described, in one embodiment, the update information can be a full copy of the static portion of the machine image. In this embodiment, the updated, full copy will replace the currently existing static portion. In another embodiment, the update information can be in the form of deltas or other incremental patches. In this embodiment, the updated copy will be the result of applying the update information to a copy of the current static portion of the machine image.

Once the host computing device 104 has stored the update in a secondary partition, at decision block 506, a test is conducted to determine whether to install the process update. In one embodiment, the host computing device 104 may be provided some criteria for determining an appropriate time for implementing the update. For example, an update may occur at a time in which host computing device utilization is at or below a threshold. If the host computing device determines that the update is not to be applied or otherwise unavailable, the routine 500 returns to block 502.

Alternatively, the host computing device 104 can determine to implement the update. Accordingly, at block 508, the host computing device processes the current primary and secondary static partitions to prepare for a switch. In one aspect, the host computing device can turn off services, discard drivers, and create backup copies. Additionally, the host computing device can designate the primary partition as a secondary partition and the previously secondary partition as the primary partition. At block 510, the host computing device 104 can then swap the primary and secondary partition to implement the update. In one embodiment, the host computing device 104 can utilize a kernel swapping procedure that does not require a reboot. In another embodiment, the host computing device 104 can utilize an operating system reset procedure that results in the swapping or switching of the primary and second partition.

At decision block 512, a test is conducted to determine whether additional updates need to be implemented. If not, the routine 500 terminates at block 514. Alternatively, in one embodiment, the host computing device may implement multiple potential updates in which the order may be provided. Accordingly, if additional updates are needed, the routine returns to decision block 506.

In another embodiment, the host computing device 104 may receive as part of the update information, operations to perform on the content of the dynamic partitions. For example, the update information can include operations performed by the host computing device 104 to keep the contents of the dynamic partitions compatible with the content of the updated static partition. For example, configuration files in the dynamic partitions may be updated from one version/ format to another to be in line with a corresponding change in the version/format understood by an application in the static partitions.

In yet another embodiment, the host computing device 104 may receive as part of the update information, operations to perform to determine if the update was successful. In this embodiment, if any condition embodied in the operations prescribed fails, the host computing device 104 can implement various processes such as aborting any remaining update processes and attempting to revert to the last known good state for the host computing device. Additionally, the host computing device 104 can also attempt to obtain and incorporate at least a portion of the update information.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable medium storing the computer executable components such as a CD-ROM, DVD-ROM, or network interface. Furthermore, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method for managing host computing devices, comprising:
   obtaining, by a host computing device, machine image data corresponding to a provisioning of the host computing device, wherein the machine image data includes a static portion and a dynamic portion;
   allocating, by the host computing device, a primary static partition and a dynamic partition;
   installing, by the host computing device, the static portion of the machine image data in the allocated primary static partition;
   installing, by the host computing device, the dynamic portion of the machine image data in the allocated dynamic partition;
   allocating, by the host computing device, one or more secondary static partitions;
   obtaining, by the host computing device, update information, the update information related to the static portion of the machine image;
   installing, by the host computing device, the update information in the allocated one or more secondary static partitions; and
   swapping, by the host computing device, the primary static partition, and a secondary static partition.

2. The method as recited in claim 1, wherein the static portion of the machine image includes at least one of operating system information, application information and configuration information.

3. The method as recited in claim 1, wherein allocating the primary static partition includes allocating the primary static partition with a read only designation.

4. The method as recited in claim 1, wherein the dynamic portion of the machine image includes at least one of modifiable configuration information and modifiable runtime files.

5. The method as recited in claim 1, wherein allocating the dynamic partition includes allocating the dynamic partition with a writeable designation.

6. The method as recited in claim 1, wherein allocating one or more secondary static partitions includes allocating one or more secondary partitions sufficient in size to maintain a copy of the static portion of the machine image.

7. The method as recited in claim 1, wherein the update corresponds to a completed version of an updated static portion of the machine image.

8. The method as recited in claim 1, wherein the update corresponds to information utilized to modify the static portion of the machine image.

9. The method as recited in claim 8, wherein installing, by the host computing device, the update information in the allocated one or more secondary static partitions includes:
   obtaining a copy of the static portion of the machine image;
   updating the copy of the static portion of the machine image in accordance with the update information; and
   installing the updated copy of the static portion of the machine image in the one or more allocated secondary static partitions.

10. The method as recited in claim 1, wherein swapping the primary and secondary static partitions includes causing an operating system reset or kernel swap.

11. The method as recited in claim 10, wherein causing the kernel swap includes causing a bootless kernel swap.

12. A method for managing host computing devices, wherein the host computing devices include a primary static partition for maintaining static portions of a machine image and a dynamic partition for maintaining dynamic portions of the machine image, the method comprising:
   allocating one or more secondary static partitions;
   obtaining update information, the update information related to a static portion of a machine image;
   installing the update information in the allocated one or more secondary static partitions; and swapping the primary static partition with the one or more secondary static partition.

13. The method as recited in claim 12, wherein the static portion of the machine image includes operating system information, application information or configuration information.

14. The method as recited in claim 12, wherein allocating the primary static partition includes allocating the primary static partition with a read only designation.

15. The method as recited in claim 12, wherein the dynamic portion of the machine image includes at least one of modifiable configuration information and modifiable runtime files.

16. The method as recited in claim 12, wherein allocating the dynamic partition includes allocating the dynamic partition with a writeable designation.

17. The method as recited in claim 12, wherein allocating one or more secondary static partitions includes allocating one or more secondary partitions sufficient in size to maintain a copy of the static portion of the machine image.

18. The method as recited in claim 12, wherein the update corresponds to a completed version of an updated static portion of the machine image.

19. The method as recited in claim 12, wherein the update corresponds to information utilized to modify the static portion of the machine image.

20. The method as recited in claim 19, wherein installing, by the host computing device, the update information in the allocated one or more secondary static partitions includes:
   obtaining a copy of the static portion of the machine image;
   updating the copy of the static portion of the machine image in accordance with the update information; and
   installing the updated copy of the static portion of the machine image in the one or more allocated secondary static partitions.

21. The method as recited in claim 12 further comprising:
   obtaining machine image data corresponding to a provisioning of the host computing device, wherein the machine image data includes a static portion and a dynamic portion;
   allocating a primary static partition and a dynamic partition;
   installing the static portion of the machine image data in the allocated primary static partition; and
   installing the dynamic portion of the machine image data in the allocated dynamic partition.

22. The method as recited in claim 12 further comprising updating the dynamic portions of the machine image data.

23. The method as recited in claim 12 further comprising determining if installing the update information was successful.

24. The method as recited in claim 23 further comprising causing a reversion to a previous state upon determining that installing the update information was not successful.

25. A method for managing host computing device comprising:
   obtaining, by a host computing device, machine image data corresponding to a provisioning of the host computing device, wherein the machine image data includes a static portion and a dynamic portion;
   allocating, by the host computing device, a primary static partition and a dynamic partition;
   allocating, by the host computing device, one or more secondary static partitions
   installing, by the host computing device, the static portion of the machine image data in the allocated primary static partition; and
   installing, by the host computing device, the dynamic portion of the machine image data in the allocated dynamic partition.

26. The method as recited in claim 25, wherein the static portion of the machine image includes at least one of operating system information, application information and configuration information.

27. The method as recited in claim 25, wherein allocating the primary static partition includes allocating the primary static partition with a read only designation.

28. The method as recited in claim 25, wherein the dynamic portion of the machine image includes at least one of modifiable configuration information and modifiable runtime files.

29. The method as recited in claim 25, wherein allocating the dynamic partition includes allocating the dynamic partition with a writeable designation.

30. The method as recited in claim 25, wherein allocating the one or more secondary static partitions includes allocating one or more secondary partitions sufficient in size to maintain a copy of the static portion of the machine image.

31. A system for managing host computing devices, wherein the host computing devices include a primary static partition for maintaining static portions of a machine image and a dynamic partition for maintaining dynamic portions of the machine image, the method comprising:
   a machine image management component, executed on a computing device including a processor and memory, the computing device executing computer-executable instructions for causing the machine image management component to:
      allocate one or more secondary static partitions;
      obtain update information, the update information related to a static portion of a machine image;
      install the update information in the allocated one or more secondary static partitions; and
      swap the primary static partition with the one or more secondary static partition.

32. The system as recited in claim 31, wherein the update corresponds to a completed version of an updated static portion of the machine image.

33. The system as recited in claim 31, wherein the update corresponds to information utilized to modify the static portion of the machine image.

34. The system as recited in claim 31, wherein the machine image management component is further operable to:
   obtain machine image data corresponding to a provisioning of the host computing device, wherein the machine image data includes a static portion and a dynamic portion;
   allocate a primary static partition and a dynamic partition;
   install the static portion of the machine image data in the allocated primary static partition; and
   install the dynamic portion of the machine image data in the allocated dynamic partition.

35. The system as recited in claim 31, wherein the machine image management component is further operable to update the dynamic portions of the machine image data.

36. The system as recited in claim 31, wherein the machine image management component is further operable to determine if the update information was successfully installed.

37. The system as recited in claim 36, wherein the machine image management component is further operable to cause a reversion to a previous state if upon determining that the update information was not successfully installed.

* * * * *

UNITED STATES PATENT AND TRADEMARK OFFICE
CERTIFICATE OF CORRECTION

PATENT NO.       : 8,635,425 B1                                Page 1 of 1
APPLICATION NO.  : 13/222992
DATED            : January 21, 2014
INVENTOR(S)      : Eden G. Adogla et al.

It is certified that error appears in the above-identified patent and that said Letters Patent is hereby corrected as shown below:

In the claims,

In column 10 at line 64, In Claim 37, change "state if" to --state--.

Signed and Sealed this
Twenty-first Day of April, 2015

Michelle K. Lee
*Director of the United States Patent and Trademark Office*